US009996329B2

(12) United States Patent
Dang et al.

(10) Patent No.: US 9,996,329 B2
(45) Date of Patent: Jun. 12, 2018

(54) TRANSLATING ATOMIC READ-MODIFY-WRITE ACCESSES

(71) Applicant: Microsoft Technology Licensing, LLC., Redmond, WA (US)

(72) Inventors: Clarence Dang, Bellevue, WA (US); Youssef Barakat, Bothell, WA (US); Arun Kishan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 15/044,707

(22) Filed: Feb. 16, 2016

(65) Prior Publication Data

US 2017/0235557 A1    Aug. 17, 2017

(51) Int. Cl.
*G06F 9/44* (2018.01)
*G06F 9/45* (2006.01)
*G06F 9/455* (2018.01)

(52) U.S. Cl.
CPC .............. *G06F 8/52* (2013.01); *G06F 9/4552* (2013.01)

(58) Field of Classification Search
CPC ................................ G06F 8/52; G06F 9/4552
USPC .................................. 717/136–137, 153–154
See application file for complete search history.

(56) References Cited

U.S. PATENT DOCUMENTS

| 5,430,860 | A | * | 7/1995 | Capps, Jr. | ............... | G06F 13/14 710/200 |
| 5,826,073 | A | | 10/1998 | Ben-Meir et al. | | |
| 5,909,567 | A | | 6/1999 | Novak et al. | | |
| 6,076,126 | A | * | 6/2000 | Shagam | .................... | G06F 9/52 709/210 |
| 6,973,551 | B1 | * | 12/2005 | Walton | ............... | G06F 9/30014 711/104 |
| 7,174,405 | B1 | * | 2/2007 | Dumov | ............... | G06F 13/4243 710/200 |

(Continued)

FOREIGN PATENT DOCUMENTS

| CN | 102364433 B | 1/2014 |
| CN | 102364442 B | 6/2014 |

OTHER PUBLICATIONS

Xiao-Wu Jiang et al., "A Parallel Full-System Emulator for Risc Architure Host", 2014, Springer-Verlag Berlin Heidelberg, pp. 1045-1052.*

(Continued)

*Primary Examiner* — Ted T Vo
(74) *Attorney, Agent, or Firm* — International IP Law Group, PLLC

(57) ABSTRACT

Various systems and methods for translating atomic read-modify-write accesses are described herein. In one example, a method includes determining that a machine instruction of a first language specifies an atomic read-modify-write access. The method includes generating machine instructions of the second language to perform an atomic access for the address if the address is aligned. The method includes generating machine instructions of a second language to acquire a global lock if the address is unaligned. Additionally, the method includes generating machine instructions of the second language to perform a non-atomic access for the address if the address is unaligned. Also, the method includes generating machine instructions of the second language to release the global lock if the address is unaligned.

28 Claims, 3 Drawing Sheets

(56) References Cited

U.S. PATENT DOCUMENTS

| | | | |
|---|---|---|---|
| 7,328,317 B2* | 2/2008 | Hillier, III | G06F 13/1642 711/155 |
| 7,340,495 B2 | 3/2008 | Buxton et al. | |
| 7,493,599 B2 | 2/2009 | Devor et al. | |
| 7,689,566 B1 | 3/2010 | Nieuwejaar et al. | |
| 7,930,705 B2 | 4/2011 | Vo et al. | |
| 7,975,236 B1 | 7/2011 | Grechishkin et al. | |
| 8,146,107 B2 | 3/2012 | Canton | |
| 8,171,240 B1 | 5/2012 | Yeh et al. | |
| 8,527,991 B2 | 9/2013 | Hilton | |
| 8,713,351 B2 | 4/2014 | Han et al. | |
| 8,726,294 B2 | 5/2014 | Benedek et al. | |
| 8,880,851 B2 | 11/2014 | Henry et al. | |
| 8,924,986 B2 | 12/2014 | Kothandapani et al. | |
| 2005/0091635 A1 | 4/2005 | McCollum et al. | |
| 2010/0287455 A1 | 11/2010 | Tripathi et al. | |
| 2010/0287618 A1 | 11/2010 | Howell et al. | |
| 2011/0035745 A1 | 2/2011 | Li | |
| 2012/0226742 A1 | 9/2012 | Momchilov et al. | |
| 2013/0057560 A1 | 3/2013 | Chakraborty et al. | |
| 2013/0061250 A1 | 3/2013 | Kothandapani et al. | |
| 2013/0159812 A1* | 6/2013 | Loh | G11C 5/02 714/758 |
| 2013/0232510 A1 | 9/2013 | Yang et al. | |
| 2014/0115606 A1 | 4/2014 | Hamzata et al. | |
| 2014/0379876 A1 | 12/2014 | Peterson et al. | |
| 2015/0378624 A1 | 12/2015 | Choudhary et al. | |

OTHER PUBLICATIONS

LLVM, "LLVM Atomic Instructions and Concurrency Guide", Feb. 2015, retrieved from https://web.archive.org/web/20150222174101/https://llvm.org/docs/Atomics.html, 8 pages.*

Written Opinion of the International Preliminary Examining Authority for PCT Application No. PCT/US2016/026092, dated Aug. 30, 2016, 5 pages.

International Search Report and Written Opinion, Issued to PCT Application No. PCT/US2017/017072, dated May 30, 2017, 17 pages.

Sites, et al.; "Binary Translation"; Communications of the ACM, vol. 36; Feb. 2, 1993, 13 pages.

Anonymous; "Data Structure Alignment"; Wikipedia, Jul. 20, 2012; 9 pages. Retrieved from the Internet: https://en.wikipedia.org/w/index.php?title=Data_structure_alignment&olid=503245792.

Li, et al.; "An Evaluation of Misaligned Data Access Handling Mechanisms in Dynamic Binary Translation Systems"; Seventh International Symposium on Code Generation and Optimization (CGO '09); Mar. 22, 2009. 10 pages.

Baraz, et al.; "IA-32 Execution Layer: a two-phase dynamic translator designed to support IA-32 applications on Itanium®-based systems"; Microarchitecture, 2003. MICRO-36. Proceedings. 36th Annual IEEE/ACM International Symposium; Dec. 5, 2003; 11 pages.

Hong, et al.; "Efficient and Retargetable Dynamic Binary Translation on Multicores"; IEEE Transactions on Parallel and Distributed Systems, vol. 25, Issue: 3; Mar. 2014; 11 pages.

"QEMU Internals", Published on: Mar. 5, 2013, Available at: http://qemu.weilnetz.de/qemu-tech.html.

"How does the ARM Compiler Support Unaligned Accesses?", Retrieved on: Aug. 5, 2015, Available at: http://infocenter.arm.com/help/index.jsp?topic=/com.arm.doc.faqs/ka15414.html.

Wang, et al., "COREMU: A Scalable and Portable Parallel Full-system Emulator", In Technical Report, Aug. 2010, 18 pages.

Zhang, Yale, "Project: x86 to ARM Binary Translator", Published on: Apr. 8, 2011, Available at: https://www.winehq.org/pipermail/wine-devel/2011-April/089638.html.

"ARM: Is Writing/Reading from Int Atomic?", Retrieved on: Aug. 5, 2015, Available at: http://stackoverflow.com/questions/9399026/arm-is-writing-reading-from-int-atomic.

"International Preliminary Report on Patentability Issued in PCT Application No. PCT/US2016/026092", dated Nov. 22, 2016, 6 Pages.

"Sharing Code Options—Published Date", Published on: May 31, 2014, 3 pages. Available at: http://developer.xamarin.com/guides/cross-platform/application_fundamentals/building_cross_platform_applications/sharing_code_options/.

Chowdhury, et al., "Using the IBM Worklight optimization framework to build a cross-platform mobile application for multiple devices", Published on: Jul. 17, 2013, 23 pages. Available at: http://www.ibm.com/developerworks/websphere/techjournal/1307_chowdhury/1307_chowdhury.html.

Trice, Andrew, "PhoneGap advice on dealing with Apple application rejections", Published on: Nov. 2, 2012 4 pages. available at: http://www.adobe.com/devnet/phonegap/articles/apple-application-rejections-and-phonegap-advice.html.

Douceur, et al., "Leveraging Legacy Code to Deploy Desktop Applications on the Web", In Proceedings of the 8th USENIX conference on Operating systems design and implementation, Dec. 8, 2008, 16 pages.

Non-Final Office Action issued to U.S. Appl. No. 14/752,215, dated Nov. 23, 2016, 11 pages.

Final Office Action Issued for U.S. Appl. No. 14/752,215 dated Mar. 21, 2017, 13 pages.

International Search Report for PCT Application No. PCT/US2016/026092 dated Jun. 22, 2016, 10 pages.

Non-Final Office Action issued in U.S. Appl. No. 14/752,215, dated Jul. 11, 2017, 16 pages.

Final Office Action, Issued in U.S. Appl. No. 14/752,215, dated Nov. 29, 2017, 15 pages.

* cited by examiner

100

TRANSLATING ATOMIC READ-MODIFY-WRITE ACCESSES

BACKGROUND

An atomic access is an attempt by one of a number of computer processors to exclusively perform a read, write, or modify on shared data in storage. Most reads and writes are atomic by default. However, in some computer programming languages, there are specific commands that ensure this atomicity. For example, the x86 assembler language uses a LOCK prefix on read-modify-write commands that are atomic. A read-modify-write command is an instruction that combines reading and arithmetic, and writes the result. These atomic accesses take place within computer programs that are designed to run on a specific computer processor. However, it may be desirable to run a computer program generated for one processor on a different computer processor.

Computer processors are designed to operate based on a prescribed machine language that can program the device. Different processors, such as the ARM and the x86 processors, each operate according to their own machine languages. Computer processors can thus be programmed to perform any number of functions based on programs written in the particular machine language. Therefore, it may be difficult for applications written in one machine language, i.e. configured to run on one computer processor, to be installed and run on a processor that operates based on a different machine language.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a system for translating atomic read-modify-write accesses. The system includes a computer processor and a computer memory. The computer memory stores instructions that cause the computer processor to determine that a machine instruction of a first language specifies an atomic read-modify-write access. Further, the instructions cause the processor to generate machine instructions of the second language to perform an atomic access for the address if the address is aligned. An aligned address, as referred to herein, includes a memory address that is a multiple of the number of bytes in the access. Further, the instructions cause the processor to generate machine instructions of the second language to acquire a global lock if the address is unaligned. An unaligned address, as referred to herein, includes a memory address that is not a multiple of the number of bytes in the access. Additionally, the instructions cause the processor to generate machine instructions of the second language to perform a non-atomic access for the address if the address is unaligned. Also, the instructions cause the processor to generate machine instructions of the second language to release a global lock if the address is unaligned.

An embodiment provides a method for translating atomic read-modify-write accesses. The method includes determining that a machine instruction of a first language specifies an atomic read-modify-write access. The method also includes generating machine instructions of a second language to acquire a global lock if the address is unaligned. The first language is for a first processor, and the second language is for a second processor. Further, the method includes generating machine instructions of the second language to perform an atomic access if the address is aligned. Additionally, the method includes generating machine instructions of the second language to perform a non-atomic access if the address is unaligned. Also, the method includes generating machine instructions of the second language to release the global lock if the address is unaligned.

An embodiment provides one or more computer-readable storage devices. The computer-readable storage devices include computer-readable instructions that, when executed by one or more processing devices, cause the one or more processing devices to determine that a machine instruction of a first language specifies an atomic read-modify-write access. Also, the computer-readable instructions cause the one or more processing devices to generate machine instructions of the second language to acquire a global lock if the address is unaligned. The first language is for a first processor, and the second language is for a second processor. Further, the computer-readable instructions cause the one or more processing devices to generate machine instructions of the second language to perform an atomic access if the address is aligned. Further, the computer-readable instructions cause the one or more processing devices to generate machine instructions of the second language to perform a non-atomic access if the address is unaligned. Additionally, the computer-readable instructions cause the one or more processing devices to generate machine instructions of the second language to release the global lock if the address is unaligned.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
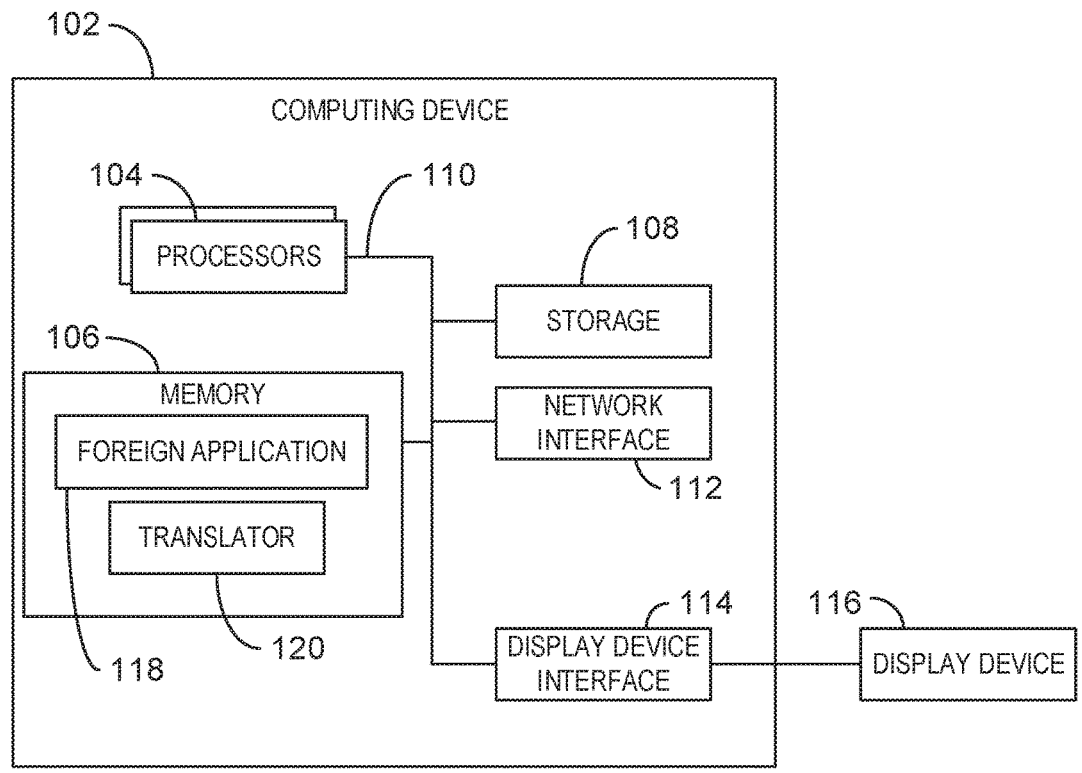
FIG. 1 is a block diagram of an example of a computing system that can translate atomic read-modify-write accesses.

Herein, a program designed for one processor running on a different processor is referred to as a foreign application. For a foreign application, a computer program called a translator is used to translate the instructions requested by the foreign application on the different processor into native instructions with the same, or similar, effect. In one example, the translator is a dynamic link library inside the foreign application. Specifically, the instructions of the foreign application are translated to the native machine language of the computer processor and executed. However, translating instructions for atomic read-modify-write accesses is a challenge because of incompatibilities between how different computer processors support atomic read-modify-write accesses. Limitations imposed by such conventional technologies, including but not restricted to those mentioned below, inhibit translating atomic read-modify-write accesses.

The techniques described herein translate the execution of atomic read-modify-write accesses for a foreign application. Translation involves translating machine language instructions from the foreign application to machine language instructions for the destination computer processor. In one example, a foreign application written in x86 machine language is translated on an ARM processor. As stated previously, the x86 machine language instruction set contains a prefix, called "LOCK," that makes accesses atomic when running on multiple computer processors, i.e., cores. In the x86 processor, the LOCK-prefixed instructions are supported for unaligned addresses.

ARM's equivalent native atomic read-modify-write instructions include load-link and store-conditional instructions, Load-Exclusive and Store-Exclusive (LDREX and STREX). LDREX and STREX are two separate instructions that are used in pairs. Also, there are variants for various data sizes that are not 4-bytes, e.g., LDREXB/STREXB for 1-byte accesses, LDREXH/STREXH for 2-byte accesses. LDREX/STREX and LDREXH/STREXH instructions only support aligned addresses. This makes it challenging to translate an x86 LOCK-prefixed instruction on the ARM processor correctly enough to run most x86 programs, but fast enough to still be useful. It is noted that these instructions are merely examples of instructions that may be used. Other instructions may also be used, such as LDXR, LDXRB, LDXRH and STXR, STXRB, and STXRH.

One potential approach is to not make unaligned accesses atomic. However, not making these accesses atomic would introduce correctness issues because there is existing x86 code that relies on atomicity, meaning the results of unaligned accesses in such programs would be incorrect. For example, suppose a program contains four threads of execution, each of which adds 1 to the same shared global variable 1,000 times. If the shared global variable starts with a value of zero, the end result of the correctly run program is a sum of 4,000. However, if the accesses are not atomic, and the shared global variable is in an unaligned memory location, the end result may not be predictable. This is because the lack of atomicity may result in each read returning a sequence of bytes, two or more of which have come from different writes. The idea of atomicity is that it is not possible to see torn writes.

Another potential approach is to serialize all memory accesses, even those to different addresses, with a global lock. A global lock coordinates the execution of multiple threads so that one thread executes at a time, even if the threads are running on a multi-core processor. However, serializing all memory accesses causes unacceptably slow processing times. Further, the approach is wasteful because, typically, the vast majority of accesses occurring at the same time are happening in different areas of memory, where there is no chance for conflict. Thus, there is no need to try to preserve atomicity with a global lock in the vast majority of cases.

Yet another potential approach is to switch to single-threaded execution when an unaligned access occurs. For example, in a binary translator, this may involve pushing all other threads out of the binary translator's code cache; performing the access; and, resuming the pushed out threads. Advantageously, such an approach would only slow down unaligned accesses, which are typically much less frequent than aligned accesses. However, the penalty would be computationally expensive when unaligned accesses do occur. Further, the approach would halt the access of some threads that are only accessing registers, not even memory. Thus, such an approach would be computationally inefficient.

In some embodiments, techniques described herein use any suitable combination of emulators and binary translators, among others, to enable the execution of atomic read-modify-write accesses for a foreign application. For example, an emulator can be used to enable the execution of machine language instructions from a foreign application by a destination computer processor. In some embodiments, an emulator can emulate a state of a processor, among others. For example, the emulator can be a virtual machine that enables the execution of atomic read-modify-write accesses for a foreign application. In some embodiments, the emulator can support full virtualization.

Another potential approach is to change the CPU to support unaligned accesses. However, only processor manufacturers are capable of implementing such a change and it may be technically challenging.

In examples of the present techniques, native support is used for atomic read-modify-write accesses with aligned addresses. In other words, LOCK-prefixed instructions for aligned addresses are translated to the appropriate load-link and store-conditional instructions, and executed. However, for LOCK-prefixed instructions with unaligned addresses, a global lock is used. In this way, the present techniques, for the common aligned case, allow concurrent read-modify-write accesses to different addresses. Aligned accesses are far more common than unaligned accesses; so, the present techniques are computationally efficient for aligned accesses.

Additionally, two threads should not perform overlapping LOCK-prefixed accesses of memory that differ in terms of start address or size. For example, if one processor accesses a semaphore using a 2-byte access, other processors should not access the semaphore using a byte access. As a result, aligned and unaligned accesses are not likely to overlap. Thus, the native support and global lock approaches can both be used without being synchronized with each other.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not computer-readable storage media) may additionally include communication media such as transmission media for wireless signals and the like.

FIG. 1 is a block diagram of an example computing system that translates atomic read-modify-write accesses. The computing system 100 may include a computing device 102 that may be, for example, a mobile phone, laptop computer, desktop computer, or tablet computer, among others. The computing device 102 may include multiple processors 104 connected by a bus 110 to a memory 106, storage device 108, network interface 112, and display device interface 114. The processors 104 execute stored instructions, and may represent a multi-core processor, a computing cluster, or any number of other multi-processor configurations. The instructions executed by the processor 104 may be used in translating atomic read-modify-write accesses. The memory unit 106 stores the executable instructions, and may be non-persistent memory, such as, random access memory (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.)), flash memory, or any other suitable memory systems. The storage 108 can include a hard drive, an optical drive, a Universal Serial Bus (USB) flash drive, an array of drives, or any combinations thereof. The system bus 110 may represent a Peripheral Component Interconnect (PCI), Industry Standard Architecture (ISA), PCI-Express, NuBus, or the like. The display device interface 114 may receive instructions from the processors that cause images to be displayed on the display device 116.

The memory 106 may include a foreign application 118 and a translator 120. The foreign application 118 is configured to be executable on a foreign computer processor, i.e., a computer processor different from the computer processors 104. Thus, the translator 120 is a binary translator that translates instructions of the foreign application 118 into native instructions that can run on the processors 104. The translator 120 performs this translation by translating instructions from the foreign application 118 to corresponding instructions for the computer processors 104, and executing the translated instructions on the computer processors 104. In one example, the translator 120 is a just-in-time compiler.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the translator 120 may be partially or entirely implemented in hardware, or in the processors 104. For example, the functionality may be implemented with an application specific integrated circuit, in logic implemented in the processor 104, or in any other device.

Figure 2:
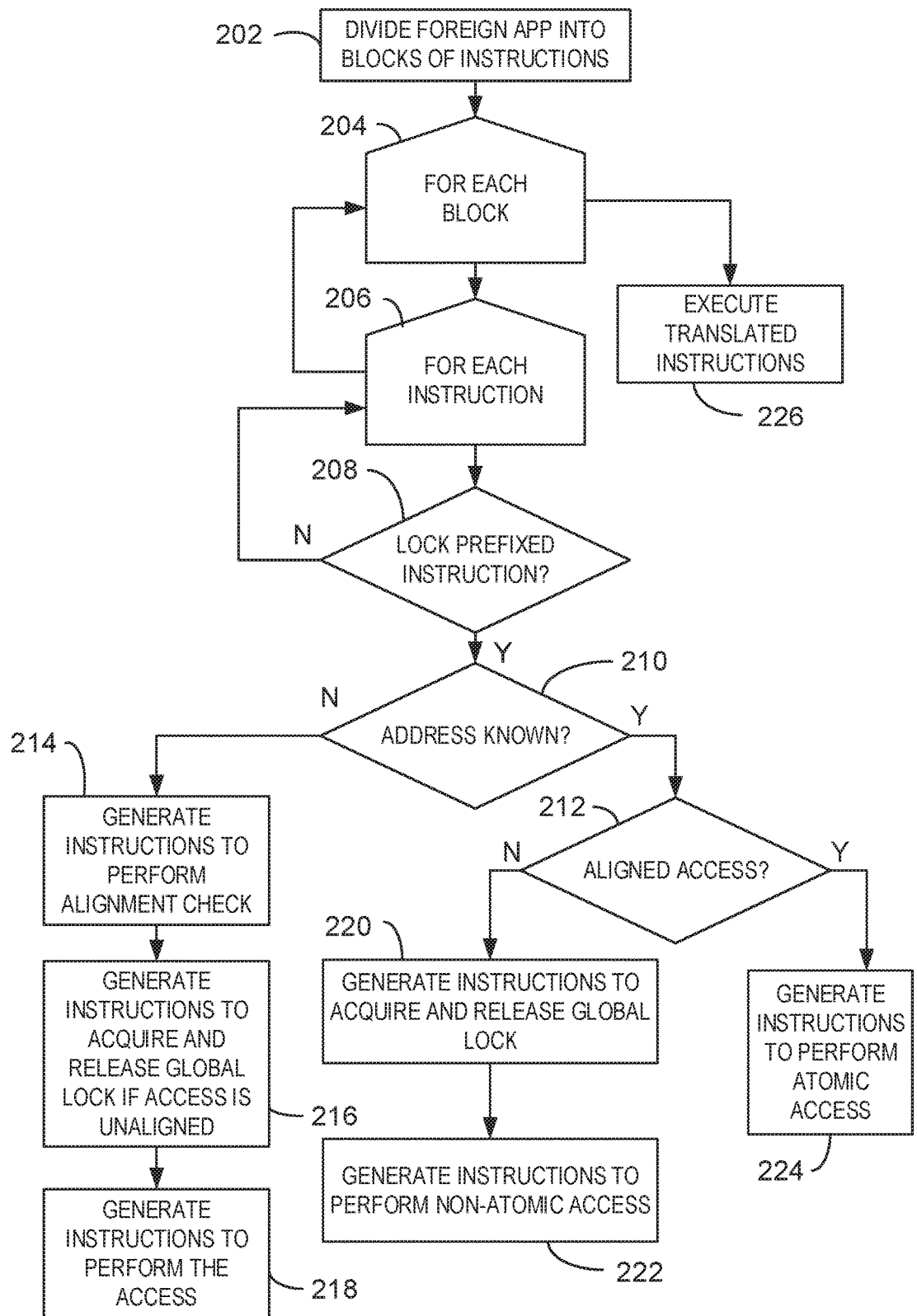
FIG. 2 is a process flow diagram of a method for translating atomic read-modify-write accesses.

FIG. 2 is a block diagram illustrating a method 200 for translating atomic read-modify-write accesses. The method may be performed by the translator 120 for the foreign application 118. At block 202, the translator 120 divides the foreign application 118 into blocks of instructions. All instructions in the same block are translated before any of the generated instructions for that block can be executed. Blocks 204 through 206 are performed for each block of instructions. Blocks 206 through 224 are performed for each instruction. At block 208, the translator 120 determines whether the instruction being translated is a LOCK prefixed atomic read-modify-write access. If so, at block 210, the translator 120 determines whether the address for the atomic read-modify-write access is known.

If the address of the data to be accessed is unknown, at block 214, instructions are generated to perform an alignment check. The alignment check determines whether the atomic read-modify-write access is aligned or unaligned. In this way, the alignment check is deferred until runtime. This allows the alignment check to choose either path during later execution. At block 216, the translator 120 generates instructions to acquire and release a global lock for atomicity if the access is unaligned. In some embodiments, a global lock can synchronize access to memory within a process, within a system, or within a security level. For example, the global lock can synchronize accesses to memory between software threads within a process or the global lock can be a mutex that synchronizes accesses to memory between software threads from one or more processes in a system. In some embodiments, software threads in various processes in a system, for which the processes are running at the same security level, can synchronize accesses to memory using a global lock associated with that security level. For example, the security level can indicate that data corresponding to an address is to be shared with a first global lock, or data corresponding to an address is to be shared with a second global lock. In this example, the first global lock may share data with a smaller number of processes than the second global lock. For example, an access can include an address and a byte size. If two processes attempt the same emulated atomic read-modify-write to a four byte value stored at address two, the unaligned accesses are synchronized using the same global lock. In another example, if a third process writes a four byte value to the same address two, the global lock is not used because it is not a read-modify-write access. If a fourth process writes a two byte value to address two, the lock is not used because the access is aligned. In some examples, two or more processes, for which at least one process is running at a different security level, may synchronize accesses to memory by using a global lock associated with the lowest of the security levels of those processes.

Additionally, at block 218, the translator 120 generates native instructions to perform the access. Thus, if the address is unaligned, the generated instructions include one or more regular, i.e., non-atomic, load instructions, and one or more regular store instructions, both of which support unaligned accesses. Thus, during execution of the translated instructions, if the access is unaligned, a global lock is acquired, the regular load and store instructions are executed, and the global lock is released. The following Pseudocode 1 represents an example of generated instructions that add the value 1 to an unaligned memory location:

---
PSEUDOCODE 1
---
CALL a routine to acquire the global lock
LOAD the value from the unaligned memory location into a register
ADD 1 to the register
STORE the new value to the unaligned memory location
CALL a routine to release the global lock

---

However, if the address is aligned, the generated instructions include one or more native instructions that implement an atomic read-modify-write, such as a compare and swap instruction, an atomic add instruction, or a load-link/store-conditional instruction pair. Thus, during execution of the translated instructions, if the access is aligned, only the atomic read-modify-write access is performed. No global lock is used. The following Pseudocode 2 represents an example of generated instructions that add the value 1 to an aligned memory location:

---
PSEUDOCODE 2
---
LOAD-LINK the value from the aligned memory location into a register
ADD 1 to the register
STORE-CONDITIONAL the new value to the aligned memory location
REPEAT IF the STORE-CONDITIONAL instruction fails

---

If the address of the data to be accessed is known, at block 212, a determination is made whether the access is aligned. If the access is unaligned, at block 220, the instructions are generated to acquire and release the global lock, as described above. Further, at block 222, instructions are generated to perform the non-atomic access, as described above. However, if the access is aligned, at block 224, the native atomic instructions are generated, as described above. In this way, if the address is unknown, two sets of instructions are generated, one to handle the aligned case, and one to handle the unaligned case. However, if the address is known, only one version of the instructions is generated, either the instructions for the aligned case or the instructions for the unaligned case.

In one embodiment, the translator 120 performs the alignment check implicitly, using a fall back to the unaligned path of execution. In this implementation, the translator 120 does not generate an explicit alignment check. Instead, the translator 120 relies on the processor 104 to generate an unaligned access exception if the LOAD-LINK instruction, or the native atomic read-modify-write instruction encounters an unaligned address. This scenario assumes the translator 120 has arranged for unaligned access exceptions to transfer control to an Unaligned Exception Handler. Such handlers may be native code for the processor 104; this is not usually code dynamically-generated by the translator 120. This code is triggered in the event the processor 104 makes an unaligned access. In such a scenario, the processor 104 triggers execution of the Unaligned Exception Handler in the event of an unaligned access. Also, there exists a per-thread variable, such as the Unaligned RecoveryAddress. The Unaligned Exception Handler is coded to resume execution at the address stored in the recovery address variable, e.g., UnalignedRecoveryAddress.

Pseudocode 3 is an example of generated instructions for such an implementation. Pseudocode 3 is a combination of the Pseudocode 1 & 2, with some modification:

---
PSEUDOCODE 3
---
SET UnalignedRecoveryAddress to UnalignedPath
AlignedPath:
LOAD-LINK the value from the aligned memory location into a register
ADD 1 to the register
STORE-CONDITIONAL the new value to the aligned memory location
GOTO AlignedPath IF the STORE-CONDITIONAL instruction fails
GOTO Done
UnalignedPath:
CALL a routine to acquire the global lock
LOAD the value from the unaligned memory location into a register
ADD 1 to the register
STORE the new value to the unaligned memory location
CALL a routine to release the global lock
Done:

---

In Pseudocode 3 under the AlignedPath, if another thread of execution accesses the same memory location after the LOAD-LINK succeeds, the STORE-CONDITIONAL will fail. In such a scenario, the LOAD-LINK is retried. On some processors, STORE-CONDITIONAL can also fail for other reasons.

In another implementation of Pseudocode 3, the translator 120 avoids generating the machine instructions for the unaligned scenario. Rather, in the unaligned scenario, there is no code generated to directly acquire the lock, to do the access non-atomically, and to release the lock. Instead, code is generated that calls a pre-generated function that acquires the lock, performs the access, and releases the lock. The pre-generated function code may be written and compiled ahead of time, in a language like C, C++, and the like. In one implementation, one function is provided for each LOCK-prefixed instruction. In another implementation, all the functions could be merged into one function. A similar approach could be done for the aligned case, where all possible versions of the aligned code exist as pre-generated functions, and the generated code calls these functions. In another implementation, native code for these functions may be dynamically generated once (or a fixed number of times), and then the many instances of generated code simply call these functions. Additionally, these techniques can be applied to any instance of any of Pseudocodes 1-5.

Additionally, in the scenario represented by Pseudocodes 1-3, the Unaligned Exception Handler may be changed to execute corresponding pre-generated or dynamically generated code.

Pseudocode 4 represents example generated code for the aligned path that uses a native COMPARE-AND-SWAP instruction instead of the LOAD-LINK or STORE-CONDITIONAL:

---
PSEUDOCODE 4
---
LOAD the value from the memory location into a register
ADD 1 to the register
COMPARE-AND-SWAP the old value with the new value, to the memory location
REPEAT IF the COMPARE-AND-SWAP returned a value that was not the old value

---

Pseudocode 5 represents example generated code for the unaligned path for the COMPARE-AND-SWAP instruction instead:

---
PSEUDOCODE 5
---
CALL a routine to acquire the global lock
LOAD the value from the unaligned memory location into a register
ADD 1 to the register
STORE the new value to the unaligned memory location
CALL a routine to release the global lock

---

In one implementation, the aligned path, e.g., Pseudocode 4, is generated, but the unaligned path is not directly generated. Instead, an Unaligned Exception Handler emulates an unaligned COMPARE-AND-SWAP by acquiring the global lock, doing a compare-and-swap operation, using non-atomic instructions supporting unaligned addresses, releasing the global lock, and resuming execution. Additionally, in another implementation, Pseudocodes 4 and 5 may be combined, in a similar way as was used to construct Pseudocode 3.

The scenario described above with respect to the COMPARE-AND-SWAP instruction may also apply to other native atomic read-modify-write instructions, such as an atomic Add. However, on some processors, it may not apply to the Load-Link or Store-Conditional instruction because an unaligned exception will later cause the Store-Conditional to fail because the processor 104 considers the Load-Link or Store-Conditional pair to have been interrupted.

Figure 3:
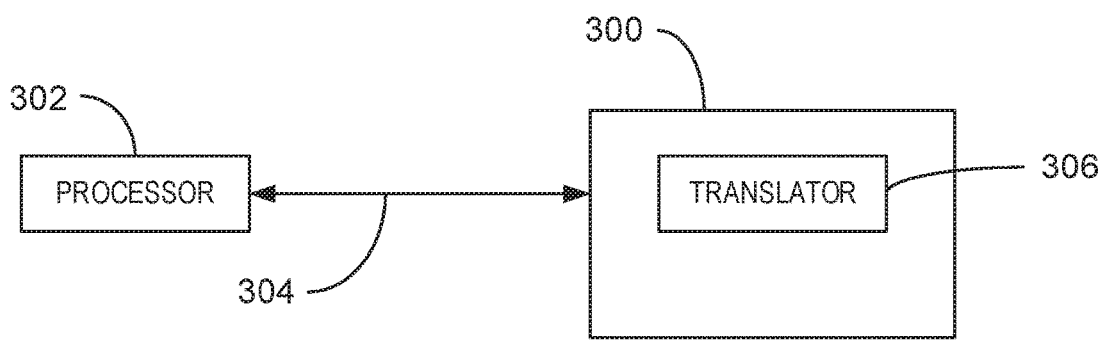
FIG. 3 is a block diagram of an example computer-readable storage media for translating atomic read-modify-write accesses.

FIG. 3 is a block diagram of an example computer-readable storage device for translating operating system processes. The computer-readable storage device 300 may be accessed by a processor 302 over a computer bus 304. Furthermore, the computer-readable storage device 300 may include code to direct the processor 302 to perform the steps of the current method.

The various software components discussed herein may be stored on the computer-readable storage device 300, as indicated in FIG. 3. For example, the tangible computer-readable storage media 300 can include a translator 306. The translator 306 determines that a machine instruction of a first language specifies an atomic read-modify-write access. Additionally, the translator 306 determines whether an address to be accessed by the machine instruction is initially known or unknown. Further, the translator 306 generates machine instructions of the second language to acquire a global lock if the address is unaligned. Also, the translator 306 generates machine instructions of the second language to perform an atomic access if the address is aligned. The translator 306 generates machine instructions of the second language to perform a non-atomic access if the address is unaligned. Additionally, the translator 306 generates machine instructions of the second language to release the global lock if the address is unaligned.

It is to be understood that any number of additional software components not shown in FIG. 3 may be included within the tangible, computer-readable storage media 300, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims. Although many examples have illustrated how foreign application 118 may be executed on an ARM processor, it will be recognized that the teachings herein may also be applied to executing x86 applications on other foreign processors, e.g., non-ARM processors. In other words, the techniques described herein may be applied to any processor wherein a foreign application making atomic read-modify-write accesses to unaligned addresses runs.

EXAMPLE 1

Example 1 is a system for translating atomic read-modify-write accesses. The system includes a computer processor and a computer memory. The computer memory stores instructions that cause the computer processor to determine that a machine instruction of a first language specifies an atomic read-modify-write access. Further, the instructions cause the processor to generate machine instructions of the second language to perform an atomic access for the address if the address is aligned. The instructions additionally cause the processor to acquire a global lock if the address is unaligned. Also, the instructions cause the processor to generate machine instructions of the second language to perform a non-atomic access for the address if the address is unaligned. Additionally, the instructions cause the processor to generate machine instructions of the second language to release a global lock if the address is unaligned.

EXAMPLE 2

Example 2 is a system for translating atomic read-modify-write accesses. The system includes a computer processor and a computer memory. The computer memory stores instructions that cause the computer processor to determine that a machine instruction of a first language specifies an atomic read-modify-write access. Further, the instructions cause the processor to generate machine instructions of the second language to perform an atomic access for the address if the address is aligned. The instructions also cause the processor to acquire a global lock if the address is unaligned. Additionally, the instructions cause the processor to generate machine instructions of the second language to perform a non-atomic access for the address if the address is unaligned. Further, the instructions cause the processor to generate machine instructions of the second language to release a global lock if the address is unaligned. In this example, the address is an aligned address.

EXAMPLE 3

Example 3 is a system for translating atomic read-modify-write accesses. The system includes a computer processor and a computer memory. The computer memory stores instructions that cause the computer processor to determine that a machine instruction of a first language specifies an atomic read-modify-write access. Further, the instructions cause the processor to generate machine instructions of the second language to perform an atomic access for the address if the address is aligned. The instruction additionally causes the processor to acquire a global lock if the address is unaligned. Also, the instructions cause the processor to generate machine instructions of the second language to perform a non-atomic access for the address if the address is unaligned. Additionally, the instructions cause the processor to generate machine instructions of the second language to release a global lock if the address is unaligned. In this example, the address is an unaligned address.

EXAMPLE 4

Example 4 is a system for translating atomic read-modify-write accesses. The system includes a computer processor and a computer memory. The computer memory stores instructions that cause the computer processor to determine that a machine instruction of a first language specifies an atomic read-modify-write access. Further, the instructions cause the processor to generate machine instructions of the second language to perform an atomic access for the address if the address is aligned. The instruction additionally causes the processor to acquire a global lock if the address is unaligned. Also, the instructions cause the processor to generate machine instructions of the second language to perform a non-atomic access for the address if the address is unaligned. Additionally, the instructions cause the processor to generate machine instructions of the second language to release a global lock if the address is unaligned. In this example, the instructions cause the processor to execute the generated machine instructions.

EXAMPLE 5

Example 5 is a system for translating atomic read-modify-write accesses. The system includes a computer processor and a computer memory. The computer memory stores instructions that cause the computer processor to determine that a machine instruction of a first language specifies an atomic read-modify-write access. Further, the instructions cause the processor to generate machine instructions of the second language to perform an atomic access for the address if the address is aligned. The instructions additionally cause the processor to acquire a global lock if the address is unaligned. Also, the instructions cause the processor to generate machine instructions of the second language to perform a non-atomic access for the address if the address is unaligned. Additionally, the instructions cause the processor to generate machine instructions of the second language to release the global lock if the address is unaligned. In this example, the instructions cause the processor to execute the generated machine instructions. In this example, executing the generated machine instructions includes acquiring the global lock. In this example, executing the generated machine instructions additionally includes performing the non-atomic access. In this example, executing the generated machine instructions also includes releasing the global lock.

EXAMPLE 6

Example 6 is a system for translating atomic read-modify-write accesses. The system includes a computer processor and a computer memory. The computer memory stores instructions that cause the computer processor to determine that a machine instruction of a first language specifies an atomic read-modify-write access. Additionally, the instructions cause the processor to generate machine instructions of a second language to perform an alignment check of the address. Further, the instructions cause the processor to generate machine instructions of the second language to perform an atomic access for the address if the address is aligned. The instructions additionally cause the processor to acquire a global lock if the address is unaligned. Also, the instructions cause the processor to generate machine instructions of the second language to perform a non-atomic access for the address if the address is unaligned. Additionally, the instructions cause the processor to generate machine instructions of the second language to release a global lock if the address is unaligned. The first language is for a first processor, and the second language is for a second processor.

EXAMPLE 7

Example 7 is a system for translating atomic read-modify-write accesses. The system includes a computer processor and a computer memory. The computer memory stores instructions that cause the computer processor to determine that a machine instruction of a first language specifies an atomic read-modify-write access. The instructions also cause the processor to determine that an address to be accessed by the machine instruction is initially unknown. Further, the instructions cause the processor to generate machine instructions of the second language to perform an atomic access for the address if the address is aligned. The instructions additionally cause the processor to acquire a global lock if the address is unaligned. Also, the instructions cause the processor to generate machine instructions of the second language to perform a non-atomic access for the address if the address is unaligned. Additionally, the instructions cause the processor to generate machine instructions of the second language to release a global lock if the address is unaligned. Alternatively, or in addition, the instructions cause the processor to acquire the global lock if the address is an aligned address, perform the non-atomic access, and release the global lock.

EXAMPLE 8

Example 8 is a system for translating atomic read-modify-write accesses. The system includes a computer processor and a computer memory. The computer memory stores instructions that cause the computer processor to determine that a machine instruction of a first language specifies an atomic read-modify-write access. Further, the instructions cause the processor to generate machine instructions of the second language to perform an atomic access for the address if the address is aligned. The instructions additionally cause the processor to acquire a global lock if the address is unaligned. Also, the instructions cause the processor to generate machine instructions of the second language to perform a non-atomic access for the address if the address is unaligned. Additionally, the instructions cause the processor to generate machine instructions of the second language to release a global lock if the address is unaligned.

Alternatively, or in addition, the machine instructions of the second language can include native atomic read-modify-write instructions to handle a case where the address is aligned. Alternatively, or in addition, the global lock can synchronize memory accesses within a process. Alternatively, or in addition, the global lock can synchronize memory accesses between processes within a system. Alternatively, or in addition, the global lock can synchronize memory accesses between processes running at the same security level. Alternatively, or in addition, the security level of a process can indicate that memory accesses can be synchronized using a first global lock or a second global lock. Alternatively, or in addition, the global lock can synchronize memory accesses between processes, for which at least one process is running at a different security level, where the lock is associated with the lowest security level of those processes.

EXAMPLE 9

Example 9 is a method for translating atomic read-modify-write accesses. The method includes determining that a machine instruction of a first language specifies an atomic read-modify-write access. The method additionally includes determining whether the address is aligned. Further, the method includes generating machine instructions of the second language to perform an atomic access for the address if the address is aligned. The method also includes generating machine instructions of a second language to acquire a global lock if the address is unaligned. The first language is for a first processor, and the second language is for a second processor. Additionally, the instructions cause the processor to generate machine instructions of the second language to perform a non-atomic access for the address if the address is unaligned. Also, the method includes generating machine instructions of the second language to release the global lock if the address is unaligned.

EXAMPLE 10

Example 10 is a method for translating atomic read-modify-write accesses. The method includes determining that a machine instruction of a first language specifies an atomic read-modify-write access. In this example, the method includes determining that an address to be accessed by the machine instruction is known. The method additionally includes determining whether the address is aligned. Further, the method includes generating machine instructions of the second language to perform an atomic access for the address if the address is aligned. The method also includes generating machine instructions of a second language to acquire a global lock if the address is unaligned. The first language is for a first processor, and the second language is for a second processor. Additionally, the instructions cause the processor to generate machine instructions of the second language to perform a non-atomic access for the address if the address is unaligned. Also, the method includes generating machine instructions of the second language to release the global lock if the address is unaligned. EXAMPLE 11

Example 11 is a method for translating atomic read-modify-write accesses. The method includes determining that a machine instruction of a first language specifies an atomic read-modify-write access. The method additionally includes determining whether the address is aligned. Further, the method includes generating machine instructions of the second language to perform an atomic access for the address if the address is aligned. The method also includes generating machine instructions of a second language to acquire a global lock if the address is unaligned. The first language is for a first processor, and the second language is for a second processor. Additionally, the instructions cause the processor to generate machine instructions of the second language to perform a non-atomic access for the address if the address is unaligned. Also, the method includes generating machine instructions of the second language to release the global lock if the address is unaligned. In this example, the address is an unaligned address.

EXAMPLE 12

Example 12 is a method for translating atomic read-modify-write accesses. The method includes determining that a machine instruction of a first language specifies an atomic read-modify-write access. The method additionally includes determining whether the address is aligned. Further, the method includes generating machine instructions of the second language to perform an atomic access for the address if the address is aligned. The method also includes generating machine instructions of a second language to acquire a global lock if the address is unaligned. The first language is for a first processor, and the second language is for a second processor. Additionally, the instructions cause the processor to generate machine instructions of the second language to perform a non-atomic access for the address if the address is unaligned. Also, the method includes generating machine instructions of the second language to release the global lock if the address is unaligned. In this example, the method includes executing the generated instructions.

EXAMPLE 13

Example 13 is a method for translating atomic read-modify-write accesses. The method includes determining that a machine instruction of a first language specifies an atomic read-modify-write access. The method additionally includes determining whether the address is aligned. Further, the method includes generating machine instructions of the second language to perform an atomic access for the address if the address is aligned. The method also includes generating machine instructions of a second language to acquire a global lock if the address is unaligned. The first language is for a first processor, and the second language is for a second processor. Additionally, the instructions cause the processor to generate machine instructions of the second language to perform a non-atomic access for the address if the address is unaligned. Also, the method includes generating machine instructions of the second language to release the global lock if the address is unaligned. In this example, the address is an unaligned address. In this example, the method includes executing the generated instructions. In this example, executing the generated machine instructions includes acquiring the global lock. In this example, executing the generated machine instructions additionally includes performing the non-atomic access. In this example, executing the generated machine instructions also includes releasing the global lock.

EXAMPLE 14

Example 14 is a method for translating atomic read-modify-write accesses. The method includes determining that a machine instruction of a first language specifies an atomic read-modify-write access. Additionally, the method includes determining that the address is initially unknown. The method additionally includes determining whether the address is aligned. Further, the method includes generating machine instructions of the second language to perform an atomic access for the address if the address is aligned. The method also includes generating machine instructions of a second language to acquire a global lock if the address is unaligned. The first language is for a first processor, and the second language is for a second processor. Additionally, the instructions cause the processor to generate machine instructions of the second language to perform a non-atomic access for the address if the address is unaligned. Also, the method includes generating machine instructions of the second language to release the global lock if the address is unaligned.

EXAMPLE 15

Example 15 is a method for translating atomic read-modify-write accesses. The method includes determining that a machine instruction of a first language specifies an atomic read-modify-write access. The method further includes determining that an address to be accessed by the machine instruction is initially unknown. The method additionally includes determining whether the address is aligned. Further, the method includes generating machine instructions of the second language to perform an atomic access for the address if the address is aligned. The method also includes generating machine instructions of a second language to acquire a global lock if the address is unaligned. The first language is for a first processor, and the second language is for a second processor. Additionally, the instructions cause the processor to generate machine instructions of the second language to perform a non-atomic access for the address if the address is unaligned. Also, the method includes generating machine instructions of the second language to release the global lock if the address is unaligned.

EXAMPLE 16

Example 16 is a method for translating atomic read-modify-write accesses. The method includes determining that a machine instruction of a first language specifies an atomic read-modify-write access. The method additionally includes determining whether the address is aligned. Further, the method includes generating machine instructions of the second language to perform an atomic access for the address if the address is aligned. The method also includes generating machine instructions of a second language to acquire a global lock if the address is unaligned. The first language is for a first processor, and the second language is for a second processor. Additionally, the instructions cause the processor to generate machine instructions of the second language to perform a non-atomic access for the address if the address is unaligned. Also, the method includes generating machine instructions of the second language to release the global lock if the address is unaligned. Additionally, the machine instructions of the second language include native atomic read-modify-write instructions to handle a case where the address is aligned.

EXAMPLE 17

Example 17 is one or more computer-readable storage devices for storing computer-readable instructions that, when executed by one or more processing devices, cause the one or more processing devices to determine that a machine instruction of a first language specifies an atomic read-modify-write access. Further, the computer-readable instructions cause the one or more processing devices to generate machine instructions of the second language to perform an atomic access for the address if the address is aligned. Also, the computer-readable instructions cause the one or more processing devices to generate machine instructions of the second language to acquire a global lock if the address is unaligned. Additionally, the instructions cause the processor to generate machine instructions of the second language to perform a non-atomic access for the address if the address is unaligned. Additionally, the computer-readable instructions cause the one or more processing devices to generate machine instructions of the second language to release the global lock if the address is unaligned.

EXAMPLE 18

Example 18 is one or more computer-readable storage devices for storing computer-readable instructions that, when executed by one or more processing devices, cause the one or more processing devices to determine that a machine instruction of a first language specifies an atomic read-modify-write access. Further, the computer-readable instructions cause the one or more processing devices to generate machine instructions of the second language to perform an atomic access for the address if the address is aligned. Also, the computer-readable instructions cause the one or more processing devices to generate machine instructions of the second language to acquire a global lock if the address is unaligned. Additionally, the instructions cause the processor to generate machine instructions of the second language to perform a non-atomic access for the address if the address is unaligned. Additionally, the computer-readable instructions cause the one or more processing devices to generate machine instructions of the second language to release the global lock if the address is unaligned. In this example, the address is an unaligned address.

EXAMPLE 19

Example 19 is one or more computer-readable storage devices for storing computer-readable instructions that, when executed by one or more processing devices, cause the one or more processing devices to determine that a machine instruction of a first language specifies an atomic read-modify-write access. Further, the computer-readable instructions cause the one or more processing devices to generate machine instructions of the second language to perform an atomic access for the address if the address is aligned. Also, the computer-readable instructions cause the one or more processing devices to generate machine instructions of the second language to acquire a global lock if the address is unaligned. Additionally, the instructions cause the processor to generate machine instructions of the second language to perform a non-atomic access for the address if the address is unaligned. Additionally, the computer-readable instructions cause the one or more processing devices to generate machine instructions of the second language to release the global lock if the address is unaligned. In this example, the computer-readable instructions cause the one or more processing devices to execute the generated instructions.

EXAMPLE 20

Example 20 is one or more computer-readable storage devices for storing computer-readable instructions that, when executed by one or more processing devices, cause the one or more processing devices to determine that a machine instruction of a first language specifies an atomic read-modify-write access. Further, the computer-readable instructions cause the one or more processing devices to generate machine instructions of the second language to perform an atomic access for the address if the address is aligned. Also, the computer-readable instructions cause the one or more processing devices to generate machine instructions of the second language to acquire a global lock if the address is unaligned. Additionally, the instructions cause the processor to generate machine instructions of the second language to perform a non-atomic access for the address if the address is unaligned. Additionally, the computer-readable instructions cause the one or more processing devices to generate machine instructions of the second language to release the global lock if the address is unaligned. In this example, the address is an unaligned address. In this example, the computer-readable instructions cause the one or more processing devices to execute the generated instructions. In this example, executing the generated machine instructions includes acquiring the global lock. In this example, executing the generated machine instructions additionally includes performing the non-atomic access. In this example, executing the generated machine instructions also includes releasing the global lock.

EXAMPLE 21

Example 21 is one or more computer-readable storage devices for storing computer-readable instructions that, when executed by one or more processing devices, cause the one or more processing devices to determine that a machine instruction of a first language specifies an atomic read-modify-write access. Further, the computer-readable instructions cause the one or more processing devices to generate machine instructions of the second language to perform an atomic access for the address if the address is aligned. Also, the computer-readable instructions cause the one or more processing devices to generate machine instructions of the second language to acquire a global lock if the address is unaligned. Additionally, the instructions cause the processor to generate machine instructions of the second language to perform a non-atomic access for the address if the address is unaligned. Additionally, the computer-readable instructions cause the one or more processing devices to generate machine instructions of the second language to release the global lock if the address is unaligned.

EXAMPLE 22

Example 22 is one or more computer-readable storage devices for storing computer-readable instructions that, when executed by one or more processing devices, cause the one or more processing devices to determine that a machine instruction of a first language specifies an atomic read-modify-write access. Further, the computer-readable instructions cause the one or more processing devices to determine that the address is initially unknown. Further, the computer-readable instructions cause the one or more processing devices to generate machine instructions of the second language to perform an atomic access for the address if the address is aligned. Also, the computer-readable instructions cause the one or more processing devices to generate machine instructions of the second language to acquire a global lock if the address is unaligned. Additionally, the instructions cause the processor to generate machine instructions of the second language to perform a non-atomic access for the address if the address is unaligned. Additionally, the computer-readable instructions cause the one or more processing devices to generate machine instructions of the second language to release the global lock if the address is unaligned. Alternatively, or in addition, the global lock synchronizes accesses within a process. Alternatively, or in addition, the global lock synchronizes accesses between processes within a system. Alternatively, or in addition, a security level of the processes indicates that data corresponding to the accesses is to be shared using the global lock or the data corresponding to the accesses is to be shared using a second global lock.

EXAMPLE 23

Example 23 is one or more computer-readable storage devices for storing computer-readable instructions that, when executed by one or more processing devices, cause the one or more processing devices to determine that a machine instruction of a first language specifies an atomic read-modify-write access. Further, the computer-readable instructions cause the one or more processing devices to generate machine instructions of the second language to perform an atomic access for the address if the address is aligned. Also, the computer-readable instructions cause the one or more processing devices to generate machine instructions of the second language to acquire a global lock if the address is unaligned. Additionally, the instructions cause the processor to generate machine instructions of the second language to perform a non-atomic access for the address if the address is unaligned. Additionally, the computer-readable instructions cause the one or more processing devices to generate machine instructions of the second language to release the global lock if the address is unaligned. Additionally, the machine instructions of the second language comprise native atomic read-modify-write instructions to handle a case where the address is aligned.

EXAMPLE 24

Example 24 is one or more computer-readable storage devices for storing computer-readable instructions that, when executed by one or more processing devices, cause the one or more processing devices to determine that a machine instruction of a first language specifies an atomic read-modify-write access. Further, the computer-readable instructions cause the one or more processing devices to generate machine instructions of the second language to perform an atomic access for the address if the address is aligned. Also, the computer-readable instructions cause the one or more processing devices to generate machine instructions of the second language to acquire a global lock if the address is unaligned. Additionally, the instructions cause the processor to generate machine instructions of the second language to perform a non-atomic access for the address if the address is unaligned. Additionally, the computer-readable instructions cause the one or more processing devices to generate machine instructions of the second language to release the global lock if the address is unaligned. In this example, the address is aligned.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art. In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive like the term "comprising" as an open transition word without precluding any additional or other elements.

What is claimed is:

1. A system for translating atomic read-modify-write accesses, comprising:
   a processor to:
   determine that a machine instruction of a first language specifies an atomic read-modify-write access for an address;
   generate machine instructions of a second language to perform an atomic access for the address if the address is aligned;
   generate machine instructions of the second language to acquire a global lock if the address is unaligned;
   generate machine instructions of the second language to perform a non-atomic access for the address if the address is unaligned; and
   generate machine instructions of the second language to release the global lock if the address is unaligned.

2. The system of claim 1, wherein the address is an aligned address.

3. The system of claim 1, wherein the address is an unaligned address.

4. The system of claim 1, wherein the processor is to execute the generated machine instructions.

5. The system of claim 4, wherein executing the generated machine instructions comprises:
   acquiring the global lock;
   performing the non-atomic access; and
   releasing the global lock.

6. The system of claim 4, wherein executing the generated machine instructions comprises:
   performing the atomic access.

7. The system of claim 1, wherein the processor is to generate machine instructions of a second language to perform an alignment check of the address, wherein the first language is for a first processor, and wherein the second language is for a second processor.

8. The system of claim 1, wherein the processor is to determine whether the address is initially known or unknown.

9. The system of claim 1, wherein the machine instructions of the second language comprise native atomic read-modify-write instructions to handle a case where the address is aligned.

10. The system of claim 1, wherein the global lock synchronizes accesses within a process.

11. The system of claim 1, wherein the global lock synchronizes accesses between processes within a system.

12. The system of claim 11, wherein a security level of the processes indicates that data corresponding to the accesses is to be shared using the global lock or the data corresponding to the accesses is to be shared using a second global lock.

13. A method for translating atomic read-modify-write accesses, comprising:
   determining, via a processor, that a machine instruction of a first language specifies an atomic read-modify-write access wherein the first language is for a first processor;
   determining, via the processor, whether the address is aligned;
   generating, via the processor, machine instructions of a second language to acquire a global lock if the address is unaligned, wherein the second language is for a second processor;
   generating, via the processor, machine instructions of the second language to perform an atomic access for the address if the address is aligned;
   generating, via the processor, machine instructions of the second language to perform a non-atomic access for the address if the address is unaligned; and
   generating, via the processor, machine instructions of the second language to release the global lock if the address is unaligned.

14. The method of claim 13, wherein the address comprises an aligned address.

15. The method of claim 13, wherein the address comprises an unaligned address.

16. The method of claim 13, comprising executing the generated machine instructions.

17. The method of claim 16, wherein executing the generated machine instructions comprises:
acquiring the global lock;
performing the non-atomic access; and
releasing the global lock.

18. The method of claim 16, wherein executing the generated machine instructions comprises performing the atomic access.

19. The method of claim 13, comprising generating machine instructions of a second language to perform an alignment check of the address, wherein the first language is for a first processor, and wherein the second language is for a second processor.

20. The method of claim 13, comprising determining whether the address is initially known or unknown.

21. The method of claim 13, wherein the machine instructions of the second language comprise native atomic read-modify-write instructions to handle a case where the address is aligned.

22. One or more computer-readable storage devices for storing computer-readable instructions that, when executed by one or more processing devices, cause the one or more processing devices to:
determine that a machine instruction of a first language specifies an atomic read-modify-write access;
generate machine instructions of the second language to acquire a global lock if the address is unaligned;
generate machine instructions of the second language to perform an atomic access for the address if the address is aligned;
generate machine instructions of the second language to perform a non-atomic access for the address if the address is unaligned; and
generate machine instructions of the second language to release the global lock if the alignment check determines the address is unaligned.

23. The computer-readable storage devices of claim 22, wherein the address comprises an unaligned address.

24. The computer-readable storage devices of claim 22, wherein the instructions, when executed by one or more processing devices, cause the one or more processing devices to execute the generated machine instructions.

25. The computer-readable storage devices of claim 24, wherein executing the generated machine instructions comprises:
acquiring the global lock;
performing the non-atomic access; and
releasing the global lock.

26. The computer-readable storage device of claim 22, wherein the global lock synchronizes accesses within a process.

27. The computer-readable storage device of claim 22, wherein the global lock synchronizes accesses between processes within a system.

28. The computer-readable storage device of claim 27, wherein a security level of the processes indicates that data corresponding to the accesses is to be shared using the global lock or the data corresponding to the accesses is to be shared using a second global lock.

* * * * *